Feb. 17, 1953
C. H. HOLDER
2,628,968
REDUCTION OF CARBON FORMATION
IN HYDROCARBON SYNTHESIS
Filed Sept. 30, 1948
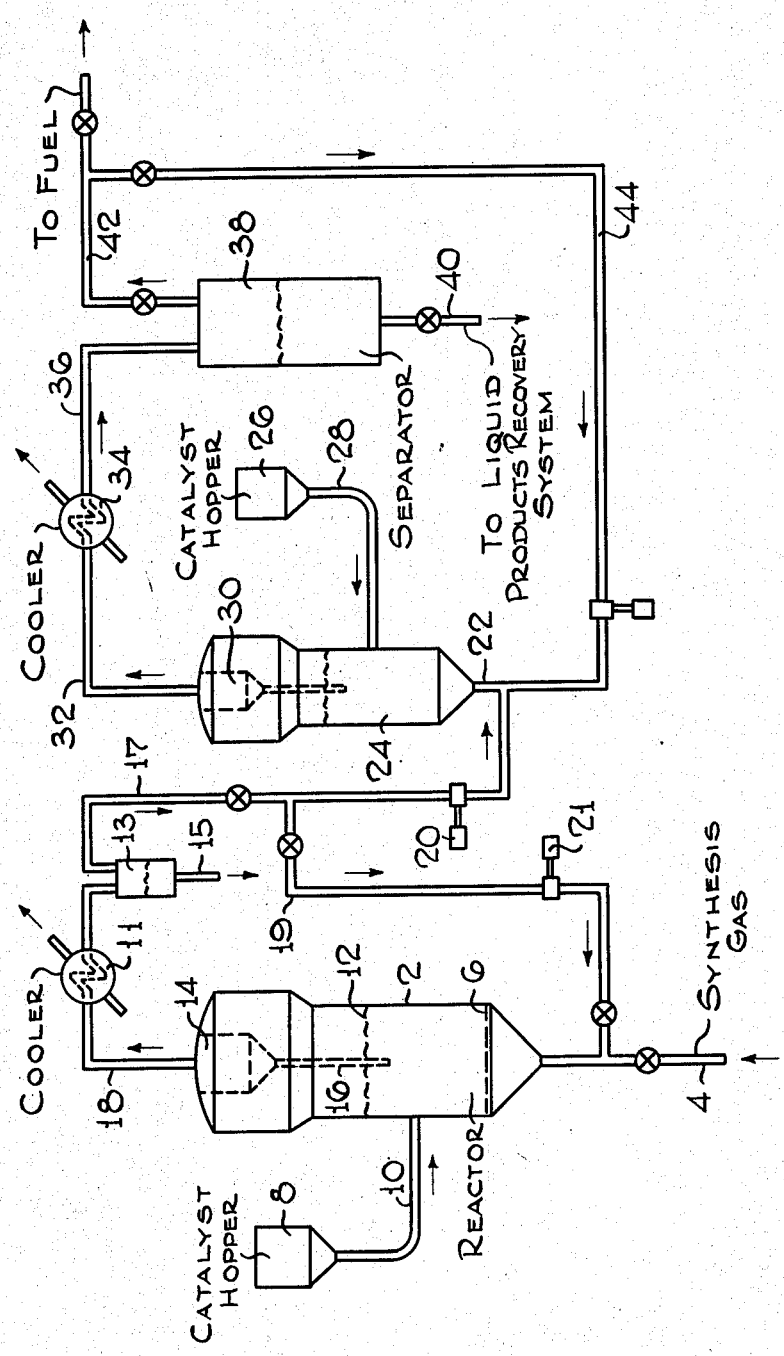
Clinton H. Holder Inventor
By J. Cashman Attorney Patented Feb. 17, 1953

2,628,968

UNITED STATES PATENT OFFICE 2,628,968

REDUCTION OF CARBON FORMATION IN HYDROCARBON SYNTHESIS

Clinton H. Holder, Cranford, N. J., assignor to Standard Oil Development Company, a corporation of Delaware Application September 30, 1948, Serial No. 51,984

3 Claims. (Cl. 260—449.6)

The present invention relates to the synthesis of hydrocarbons from carbon oxides and hydrogen in the presence of suitable catalysts. The invention relates more particularly to a process for obtaining high yields of normally liquid hydrocarbons boiling within the gasoline and diesel oil range and concomitantly retarding excessive catalyst fouling and disintegration.

The synthesis of hydrocarbons and other valuable products from gas mixtures containing various proportions of hydrogen and carbon oxides, particularly carbon monoxide, both in fixed bed as well as in dense phase fluid catalyst operation is well known in the art. The character and quality of the synthesis product depends largely on the temperatures, pressures, $H_2:CO$ ratios of the feed gas and the nature of the catalyst used, the latter being usually an iron group metal catalyst promoted with such promoters as various alkali metal compounds, rare earth metal oxides, magnesia, alumina, etc., in amounts of about 0.5–10%. Thus cobalt catalysts promoted with thoria and/or magnesia have been used at relatively low pressures of about 15–75 p. s. i. g. and relatively low temperatures of about 350°–450° F. and high $H_2:CO$ ratio of 2 or more to produce a substantially saturated hydrocarbon material from which valuable diesel fuels, lubricating oils, and waxes may be obtained. Iron-type catalysts, usually promoted with a suitable alkali metal compound, such as carbonates, halides, etc., of potassium or sodium may be used in combination with relatively high pressures up to 600–700 p. s. i. g. and temperatures of 450°–750° F., and lower $H_2:CO$ ratios generally not above 2, to produce predominantly unsaturated material from which large proportions of high octane motor fuels may be recovered.

While it has thus been possible to obtain high octane motor fuels in good yields by this process, it has also been found that operations under conditions that favor good yields of useful (i. e., $C_4+$oil) products are accompanied by excessive deposition of carbon and carbonaceous material upon the catalyst. This carbon deposition is a serious problem, particularly when the catalytic operation is carried out by the fluid catalyst technique, which latter because of better heat distribution, transfer and control and because of the more intimate mixing and contact of the catalyst with the reactants, is considered far superior to fixed bed processes for effecting the catalytic synthesis of hydrocarbons. However, two problems that arise in conjunction with the fluid solids type of operation are the fouling and consequent inactivation of the catalyst by carbon deposition, and the tendency of catalyst particles to disintegrate, presumably as a result of the carbon formation and deposition. Carbon deposition and catalyst disintegration not only cut down product yield but cause poor fluidization of the catalyst, excessive fines formation, agglomeration and conditions requiring shut down of the plant.

It has heretofore been found that the tendency for carbonaceous material to deposit on the catalyst and for catalysts to disintegrate may be related to certain operating variables. Thus it is known that relatively fresh synthesis catalyst tends to deposit carbon at a substantially higher rate than catalyst that has been resident in the system for a relatively longer period of time. It is also known that the carbon formation tendencies and characteristics of a catalyst can be controlled and minimized to a considerable extent by increasing the partial pressure of the hydrogen fed to the hydrocarbon synthesis zone. Thus, typical experimental data have shown that, at a hydrogen partial pressure of about 140 p. s. i., an iron synthesis catalyst, such as an alkali metal promoted pyrites ash catalyst, will yield, when it has an average age or residence time under synthesis conditions of 0–75 hours, about 2.2 grams of carbon per $m^3(H_2+CO)$ consumed. When the average catalyst age has increased to 75–400 hours, the carbon figure drops to about 1.4. If the catalyst age for the same catalyst averages 400+ hours, the rate of carbon formation drops to about 0.4 gram. Again, for a given age catalyst, as it has been pointed out, the rate of carbon formation decreases with increase in hydrogen partial pressure in the system. Thus, at a catalyst age averaging 75–400 hours under synthesis conditions and operating under hydrogen partial pressure of about 100 p. s. i. in the synthesis reactor, carbon was deposited at the rate of about 3.2 grams per cubic meter of $H_2+CO$ consumed. Operating at 180 p. s. i. reduced this figure to 0.9 gram, and at 240 p. s. i., to about 0.6 gram.

Unfortunately, desirable as it is to keep carbon formation at a low rate it has been found hitherto that, in general, these factors favoring low rate of carbon formation also tend to keep down the yields of useful synthesis products and, conversely, those operating conditions which favor high yields of $C_4+$ hydrocarbons also favor formation of excessive amounts of carbon. Thus, as indicated, when the hydrogen partial pressure in the synthesis feed gas is increased to, say, about 200 psi., by raising the ratio of hydrogen in the feed, the selectivity to liquid hydrocarbon of the gasoline range is generally low. Similarly if, as a result of feeding fresh feed and recycle tail gas, the ratio of hydrogen to the total constituents of the gas feed, or $H_2/H_2+CO+CO_2$ ratio is low, the selectivity to useful products is high, but the rate of carbon formation also is excessive. Again, as has been pointed out, fresh catalyst is highly reactive, but tends to form large quantities of carbon whereas, under the same reaction conditions, aged catalyst produces less carbon but also less $C_4+$ oil. Again those hydrocarbon synthesis catalysts that are active and give high yields of $C_4+$ products also form large quantities of carbon, and those synthesis catalysts which deposit low quantities of carbon under normal synthesis conditions generally have a low selectivity to useful liquid synthesis products.

It is, therefore, the principal object of the present invention to provide an improved process for the conversion of CO and $H_2$ to form high yields of normally liquid hydrocarbon without forming excessive amounts of carbon during the conversion and without excessive fragmentation of the catalyst.

Other and more specific objects and advantages of the invention will appear hereinafter.

It has now been found that high yields of useful synthesis products unaccompanied by excessive carbon formation and catalyst disintegration may be obtained by operating a hydrocarbon synthesis plant comprising two synthesis reaction stages, using a catalyst of low activity in the first reactor, followed by a catalyst of relatively high activity in the second reactor operating at substantially higher pressure than the first reactor.

In accordance with the invention, a catalyst of high mechanical strength, but of relatively low activity at ordinary synthesis temperatures, such as severely sintered red iron oxide, is employed in the first stage under known synthesis conditions, such as 650° F. and 400 p. s. i. g., synthesis gas composition of $H_2/CO$ in the ratio of about 1.0–1.7, and a recycle/fresh feed ratio of about 2/1. Under these conditions, a synthesis gas converstion of about 70–80% is obtained. Because of the low conversion of the synthesis gas the hydrogen partial pressure in the first stage is comparatively high, in the neighborhood of 145–175 p. s. i., thus further decreasing the tendency for carbon formation in this zone, as compared to carbon formation tendencies at the normal conversions of 90–100% which obtain with active catalysts. Low activity synthesis catalysts characteristically form negligible or only slight quantities of carbon in the course of the reaction and as a consequence, disintegration of the catalyst is only very slight. Furthermore, this low activity catalyst was prepared by sintering in hydrogen at temperatures of 1550°–1650° F., a procedure which results in a catalyst which disintegrates much less readily than more active catalysts sintered at lower temperatures.

The second reaction stage contains a more active catalyst, in order to accomplish a high overall conversion; alkali-metal promoted resintered iron pyrites or ammonia synthesis type catalysts are suitable. Within the second stage reaction, low carbon formation rates are obtained without decreasing selectivities to useful liquid hydrocarbons, by increasing the hydrogen partial pressure in the feed from the first reaction stage by increase of the total pressure within the second stage reactor. Thus by maintaining the hydrogen partial pressure of about 185 to 240 p. s. i. in the second stage reactor but by increasing the total pressure from the customary or normal range of 350–450 p. s. i. g. to the high pressure range of 600–700 p. s. i. g., the low carbon formation characteristics of high hydrogen partial pressure operations are obtained even with an active catalyst, but yields and selectivities to useful products are not decreased as they normally are under high hydrogen partial pressures. Thus in operating in accordance with the present invention, wherein a partial conversion of synthesis gas is obtained in a primary conversion stage under conditions conductive to negligible carbon formation and long catalyst life, and high over-all conversion is obtained by contacting the unconverted gases from the first stage with a more active catalyst in the second stage under conditions to give high yields of useful products and low quantities of carbon deposition, it is now possible to overcome the catalyst disintegration problem associated with the iron hydrocarbon synthesis catalyst fluid technique.

The present invention and its application will best be understood from the more detailed description hereinafter, wherein reference will be made to the accompanying drawing which is a schematic illustration of a system suitable for carrying out a preferred embodiment of the invention.

Referring now to the drawing, 2 represents a reactor which is preferably in the form of a vertical cylinder having a lower conical section and an upper expanded section. A synthesis feed gas mixture of hydrogen and carbon monoxide in the ratio of about 1.0 to 2.0 mols $H_2$ to 1 mol CO is introduced into reactor 2 through line 4 and flows upwardly through a screen or grid 6 to effect good gas distribution.

Within reactor 2 there is disposed a mass of relatively low activity hydrocarbon synthesis catalyst, such as $K_2CO_3$-promoted mill scale or $K_2CO_3$-promoted red iron oxide severely sintered at temperatures in the range of 1550°–1750° F. This high sintering temperature produces a catalyst of high mechanical strength and showing a high resistance to distintegration. This catalyst is maintained in the form of a powder having a particle size distribution such that less than 20% of the particles have diameters 0–20 microns, and less than 10% of the particles have diameters larger than 80 microns. This catalyst, which is preferably promoted with an alkali metal salt, such as 0.5–1.5% $K_2CO_3$ may be supplied to reactor 2 from catalyst hopper 8 through line 10.

The linear velocity of the gases to reactor 2 is maintained within the approximate range of 0.3 to 3.0 feet per second, preferably between 0.5 to 1.0 feet per second. Under these conditions the catalyst in reactor 2 assumes the form of a dense, turbulent mass resembling a boiling liquid, with a more or less well-defined upper lever 12, and an apparent density of about 25 to 75 lbs./cu. ft. depending upon the fluidization conditions, the lower apparent density being associated with the higher velocities. The amount of synthesis gas supplied through line 4 is so controlled that about 5 to 20 normal cubic feet of $H_2+CO$ enter reactor 2 per pound of catalyst per hour.

Within reactor 2 the total pressure is adjusted to about 350–450 p. s. i. g., with a recycle tail gas to fresh feed ratio of about 2 to 1. The reaction temperature may be controlled by any convenient means, such as a cooling jacket or coil (not shown) inside or outside reactor 2. The temperature within the fluidized mass is kept uniform at about 625° to 675° F., and under these conditions a synthesis gas conversion of about 75% is obtained. At this relatively low conversion level, a hydrogen partial pressure of about 150–175 p. s. i. obtains in reactor 2.

When entering the enlarged section of reactor 2 the gas velocity is sufficiently decreased so that the gases will no longer support any substantial quantity of catalyst, and most of the catalyst particles entrained in the upflowing gases drop back into the fluidized mass. The volatile reaction products and unreacted gases, containing only small quantities of entrained catalyst are passed through a gas-solids separator 14, such as one or more cyclones, filters, etc. This removes all but traces of entrained fines, and the fines thus removed may be returned through line 16 to the fluidized bed in reactor 2.

Product vapors and gases comprising unreacted CO and $H_2$ may be withdrawn through line 18 and passed through cooler 11 to high pressure separator 13 wherein normally condensible hydrocarbons, oxygenated products, and water condense and settle. These latter may be removed via line 15 and sent to the liquid products recovery system. Unreacted synthesis gases comprising $H_2$ and CO, and uncondensed light hydrocarbons are withdrawn overhead from separator 13 via line 17, a portion recycled to reactor 2 via line 19 and recycle pump 21, and the balance passed to compressor 20, compressed to a pressure of about 650 p. s. i. g. and passed to the bottom of fluid reactor 24 via line 22. The latter is essentially of similar design to reactor 2, but is operated under different synthesis conditions. Within reactor 24 there is disposed a dense fluidized bed of an active hydrocarbon synthesis catalyst, such as ammonia synthesis catalyst or resintered iron pyrites ash preferably promoted with 0.5–1.5% $K_2CO_3$, and having essentially the same particle size distribution as the catalyst in reactor 2. This catalyst is admitted from hopper 26 via line 28. The reaction conditions prevailing within reactor 24 are preferably a temperature in the range of from about 650°–750° F., a pressure of about 550–750 p. s. i. g., a synthesis gas feed rate of about 15–25 cubic feet/hour/pound catalyst, a recycle rate of 2, linear velocity of about 0.7 to 3.0 feet per second. Under these reaction conditions, and in consequence of the 70 to 80% conversion level of synthesis gas in reactor 2 the hydrogen partial pressure in reactor 24 is about 185–240 p. s. i., whereas the hydrogen concentration in the feed gas to reactor 24, or $H_2/H_2+CO+CO_2$ ratio, is about 0.40. Thus in the second reactive stage, by maintaining a relatively high hydrogen partial pressure of about 185 to 240 p. s. i., by increasing the total pressure from the 400 p. s. i. g. level in reactor 2 to the high pressure level of 600–700 p. s. i. g. in reactor 24, the low carbon formation characteristics of high hydrogen partial pressures operation are obtained, and yields and selectivities to useful products are not decreased as they normally are under high hydrogen partial pressures.

As in the case of reactor 2, product vapors and gases are passed upwardly through gas-solids separator 30, then are withdrawn through line 32, cooler 34, and line 36 to separator 38, where liquid products may be removed and separated from the tail gas. Liquid products may be withdrawn through line 40 for processing by any method known in the art, such as distillation, extraction, catalytic reforming, etc. Tail gas may be withdrawn overhead through line 42 and be recycled to reactor 24 through lines 44 and 46.

The invention admits of numerous modifications obvious to those skilled in the art. Instead of employing two different species of catalysts in the two stages, it may be desirable to use only one kind of catalyst in the system, but at different activity levels. Thus it has already been disclosed that aged catalyst is less active than relatively fresh catalyst and so it may be desirable under certain conditions to maintain a fluid bed of aged catalyst, such as red iron oxide, in reactor 2 and a bed of relatively fresh catalyst of the same species in reactor 24.

In accordance with the reaction condition disclosed, the feed from the first synthesis stage is converted to the extent of about 80% in the second synthesis zone, making an overall conversion level of synthesis gas of about 95%. By operating in accordance with this invention, it is now possible to employ a feed of relatively low $H_2/CO$ ratio, such as 1.5/1, which ordinarily gives high yields of $C_4+$ products but also deposits large quantities of carbon on the catalyst, and obtain good selectivity to useful products without excessive carbon deposition and consequent catalyst fragmentation.

The following illustrative data are included in order to indicate operating conditions and yields representative of this invention.

| Catalyst | 1st Stage—Sintered $K_2CO_3$ Promoted Red Iron Oxide Catalyst | 2nd Stage—[1] Ammonia Synthesis Catalyst |
|---|---|---|
| Avg. Cat. Temp., °F | 650 | 650 |
| S. c. f. h./lb. Cat. (C+O free basis) | 10.0 | 20.0 |
| Recycle Ratio | 2.8 | 2.0 |
| Fresh Feed $H_2/CO$ Ratio | 1.1 | 1.4 |
| Pressure, p. s. i. g | 400 | 650 |
| Inlet Velocity, ft./sec | 0.4 | 1.0 |
| $H_2/H_2+CO+CO_2$ in total feed | 0.40 | 0.36 |
| $H_2$ Partial Pressure, p. s. i | 148 | 191 |
| $H_2+CO$ Conversion, vol. percent | 79.7 | 90.0 [2](98.0) |
| Liquid Yields, cc/m.³ of Conv. $H_2+CO$: | | |
| $C_4+$Oil | 176 | 172 |
| $C_4+$Oil+Oxy. Cpds. in $H_2O$ Layer | 215 | 197 |
| $C_3+$Oil | 239 | 235 |
| Carbon Formation, gms./m.³ of Conv. $H_2+CO$ | 0.5 | 0.9 |
| Exit Gas Composition, vol. percent: | | |
| $H_2$, vol. percent | [3]20.0 | 27.5 |
| CO, vol. percent | 22.0 | 6.9 |
| $CO_2$, vol. percent | 32.3 | 39.8 |
| $CH_4$, vol. percent | 4.2 | |
| $C_?$, vol. percent | 3.6 | |

[1] Fused magnetite admixed with minor amounts of alumina and potassium promoter, and reduced.
[2] $H_2+CO$ conversion in second stage operation of 90.0% represents an overall $H_2+CO$ conversion of 98.0%.
[3] Exit gas from stage 1 is fresh feed for stage 2.

The data in the first column are pilot plant results obtained with a $K_2CO_3$ promoted red iron oxide catalyst which had been sintered in $H_2$ at 1570° F. The low conversion of 79.7 volume percent is typical of catalyst sintered at a very high temperature. The $C_4+$ oil yield was 176 cc./m³ of converted $H_2+CO$. The carbon formation was only 0.5 gm./m³ of converted feed; the carbon content of the catalyst was 6.1% after 235 hours. The low carbon formation is characteristic of this severely sintered catalyst and represents about 50% of the carbon formation that would be predicted for a more active catalyst produced by sintering at 1500° F. or lower. After 235 hours of operation the 0-40 micron fraction of this catalyst increased from 10 to 17 weight percent and then to 20 weight percent after 451 hours indicating good mechanical strength.

If now the exit gas from the first stage is passed to a second reactor containing ammonia synthesis catalyst, a conversion of 90% is readily obtained in this reactor because of the high activity of this catalyst. In this way, a high conversion of 98% on the original synthesis gas is obtained. By increasing operating pressure to 650 p. s. i. g., carbon formation is maintained at a reasonable level (0.9 gm./m³ of $H_2+CO$ converted) in this "clean-up" reactor. Since this reactor operates on tail gas from the first stage, the size of the second high pressure reactor is smaller than the 1st stage reactor (in the order of ⅕ the size).

As indicated above, in the two-stage operation, by using the severely sintered catalyst in stage one, carbon formation is roughly 50% of that normally obtained with active catalyst. In the second stage wherein synthesis operation is carried out on the remaining 20% of the original synthesis feed gas unconverted in the first stage, carbon formation based on the feed to the second stage is equivalent to that normally obtained in high pressure operation. However, since only 20% of the total feed gas is treated in the second stage, and since in the first stage, wherein 80% of the synthesis gas was converted, only 50% of the usual carbon deposition took place, an over-all net decrease of about 60% in carbon formation is realized when operating in accordance with the present invention.

It is to be understood that the term "active" or "inactive" catalyst refers to the activity of a given catalyst under the synthesis condition, such as temperature and pressure, prevailing in the synthesis reaction zone.

While the foregoing description has served to illustrate specific applications and results of the invention, other modifications obvious to those skilled in the art are within its scope.

What is claimed is:

1. An improved process for producing valuable conversion products from CO and $H_2$ by a catalytic synthesis reaction without excessive deposition of solid carbonaceous material in the course of said synthesis which comprises contacting a synthesis feed gas mixture containing $H_2$ and CO in the ratio of about 1.0-1.5:1 at a temperature of about 650° to 700° F. with a dense, turbulent mass of finely divided potassium salt promoted iron hydrocarbon synthesis catalyst of relatively low activity under the synthesis conditions prevailing in said zone, maintaining a total pressure of about 350-450 p. s. i. g. within said zone, maintaining a hydrogen partial pressure of about 150 to 175 p. s. i. within said zone, maintaining a synthesis gas conversion level of about 70-80% within said zone, withdrawing reaction products and unreacted gases from said zone and passing unreacted carbon monoxide and hydrogen withdrawn from said first zone to a second synthesis zone, maintaining a total pressure of 600-750 p. s. i. g. and a temperature level of from about 650 to about 700° F. in said second reaction zone, maintaining a dense fluidized bed of iron type potassium promoted hydrocarbon synthesis catalyst of high activity under the synthesis conditions prevailing in said second zone, contacting the reactants with said catalyst for a sufficient period of time to attain the desired conversion, and recovering a product containing substantial amounts of hydrocarbons boiling in the gasoline range from both reaction zones.

2. The process of claim 1 wherein the feed rate of said synthesis gas mixture to said primary zone is about 10-20 cubic feet per pound of catalyst per hour and the rate of feed gas to said second reaction zone is about 20-30 cubic feet per pound catalyst per hour.

3. An improved process for producing valuable conversion products from CO and $H_2$ by a catalytic synthesis reaction without excessive deposition of carbonaceous material in the course of said synthesis, which comprises contacting a synthesis feed gas mixture containing $H_2$ and CO in the ratio of about 1.0:1.5 to 1 at a temperature of about 650° to 700° F. with a dense turbulent mass of finely divided potassium carbonate promoted red iron oxide catalyst sintered at a temperature above about 1550° F. in an atmosphere of hydrogen, maintaining a total pressure of about 350 to 450 p. s. i. g. within said zone, maintaining a hydrogen partial pressure of about 150 to 175 p. s. i. within said zone, maintaining a synthesis gas conversion level of about 70 to 80% within said zone, withdrawing reaction products and unreacted gases from said zone and passing unreacted CO and $H_2$ withdrawn from said first zone to a second synthesis zone, maintaining a total pressure of about 600 to 750 p. s. i. g. and a temperature level of about 650 to about 700° F. in said second reaction zone, maintaining a dense fluidized bed of ammonia synthesis catalyst in said second zone, contacting the reactants with said catalyst to attain a high conversion level in said zone, and recovering a product containing substantial amounts of hydrocarbons boiling in the gasoline range from both reaction zones.

CLINTON H. HOLDER.

REFERENCES CITED

The following references are of record in the file of this patent:

UNITED STATES PATENTS

| Number | Name | Date |
| --- | --- | --- |
| 2,178,824 | Atwell | Nov. 7, 1939 |
| 2,244,196 | Herbert | June 3, 1941 |
| 2,417,164 | Huber | Mar. 11, 1947 |
| 2,445,796 | Millendorf | July 27, 1948 |
| 2,451,879 | Scharmann | Oct. 19, 1948 |
| 2,461,570 | Roberts | Feb. 15, 1949 |
| 2,467,802 | Barr | Apr. 19, 1949 |